United States Patent [19]

Nakagawa

[11] Patent Number: 4,624,146
[45] Date of Patent: Nov. 25, 1986

[54] FLOW RATE MEASUREMENT APPARATUS
[75] Inventor: Yuzuru Nakagawa, Yachiyo, Japan
[73] Assignee: Onoda Cement Company, Ltd., Onoda, Japan
[21] Appl. No.: 707,688
[22] Filed: Mar. 4, 1985
[51] Int. Cl.[4] ............................................. G01F 1/46
[52] U.S. Cl. ................................................. 73/861.66
[58] Field of Search ........... 73/861.65, 861.66, 861.67, 73/861.68

[56] References Cited

U.S. PATENT DOCUMENTS

| | | | |
|---|---|---|---|
| 1,087,988 | 2/1914 | Sheldon | 73/861.66 |
| 1,119,581 | 12/1914 | Dodge | 73/861.66 |
| 1,508,017 | 9/1924 | Greve | 73/861.66 |
| 2,975,225 | 3/1961 | Barbieri et al. | 73/861.65 |
| 3,581,565 | 6/1971 | Dieterich | 73/861.65 |
| 4,498,347 | 2/1985 | Grantham et al. | 73/861.66 |

FOREIGN PATENT DOCUMENTS 2210900 12/1978 Fed. Rep. of Germany ... 73/861.65

OTHER PUBLICATIONS

Rahmeyer et al "Development of an Averaging Type Pitot—Probe for Discharge Measurements" in Conf. Instrumentation in the Aerospace Ind. vol. 27, 4/81, pp. 545–549.

Primary Examiner—Herbert Goldstein
Attorney, Agent, or Firm—Amster, Rothstein & Ebenstein

[57] ABSTRACT

A flow rate measurement apparatus is comprised of a generally cylindrical tubular main body introduced transversely of the main duct through which flows a fluid whose flow rate is to be measured. A first conduit for measuring the total pressure and a second conduit for measuring the static pressure are introduced along the upstream and downstream sides of the interior of the tubular main body, respectively, while coolant water inlet and outlet pipes are also introduced into the mid portion of the interior of the main body for circulation and cooling. Dust and dirt entrained in the fluid and introduced into the first and second conduits descends by gravity so as to be collected in associated dust boxes for removal.

4 Claims, 4 Drawing Figures

FIG. 1
FIG. 2
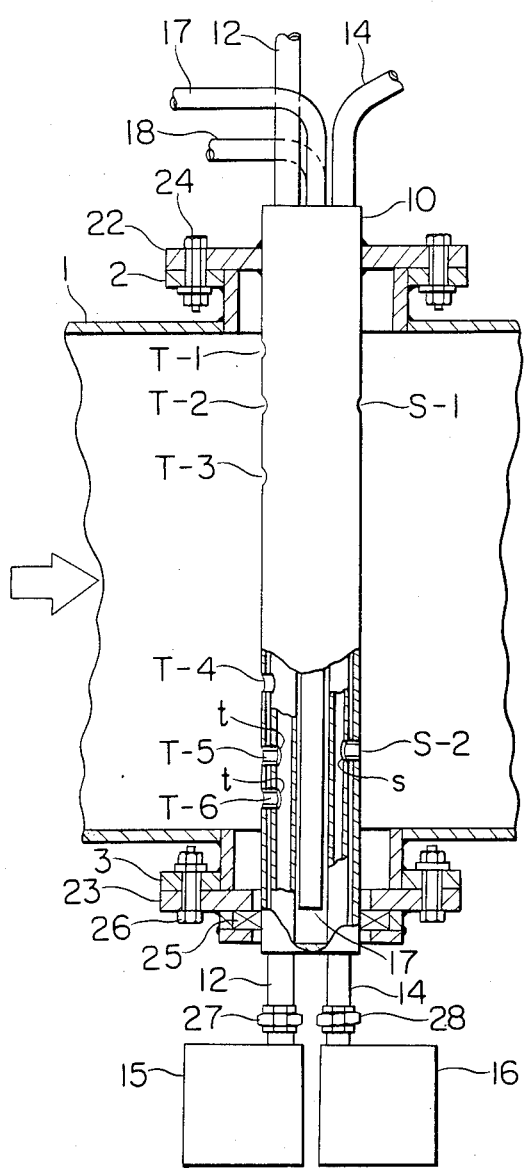
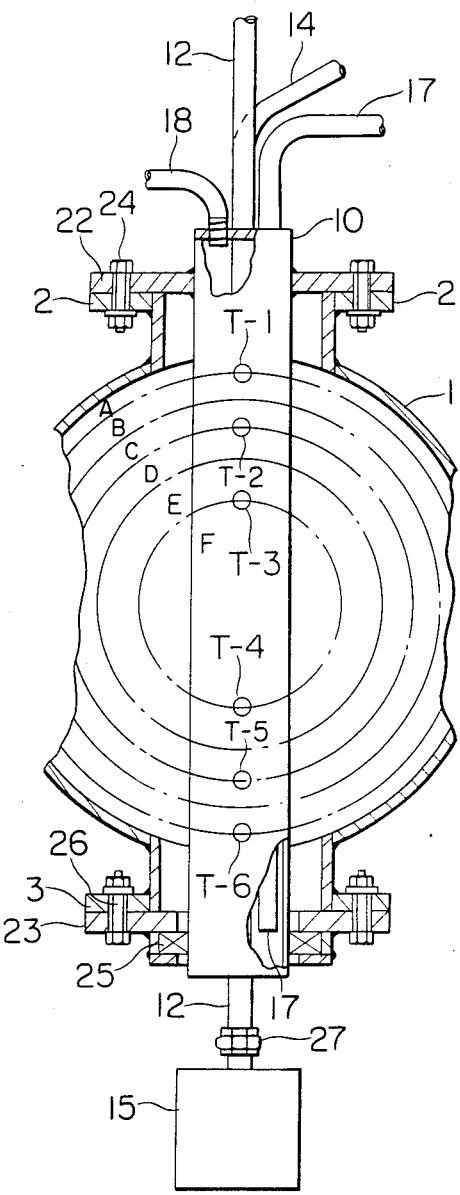

FIG. 3
FIG. 4
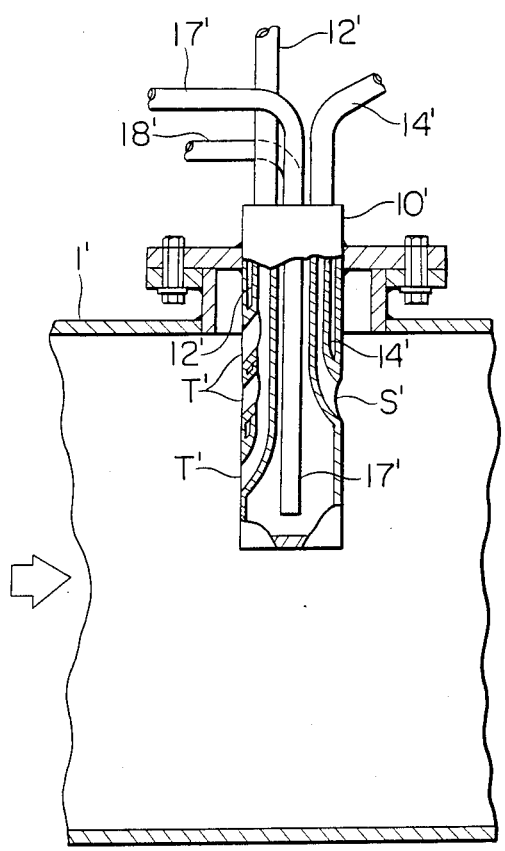
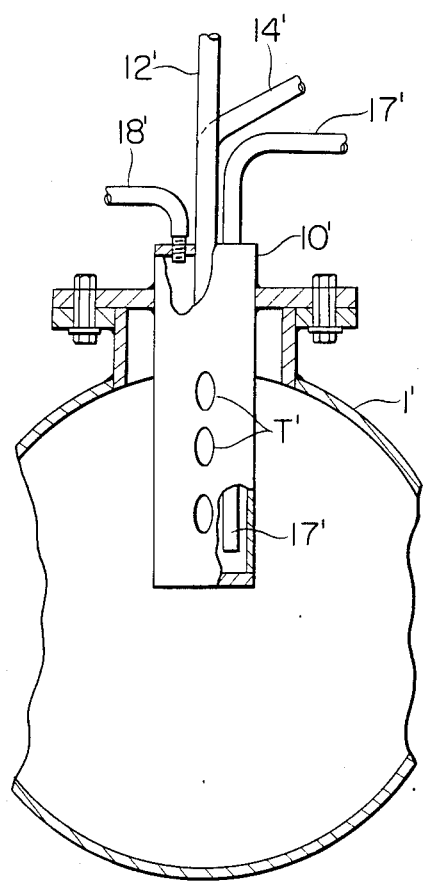

FLOW RATE MEASUREMENT APPARATUS

BACKGROUND OF THE INVENTION

This invention relates to an apparatus by means of which the flow rate of a gas can be measured stably and continuously for a prolonged period of time in a high temperature and dust containing environment.

In measuring the flow rate of a fluid flowing through a duct, it is known to use the following relation: a quantity indicative of the total energy possessed by a fluid ('total pressure') is equal to the sum of the energy proper to the fluid in the static state ('static pressure') and the energy proper to the fluid in motion ('dynamic pressure'); and it has been known to make use of the above described relation to measure the total pressure and the static pressure of the fluid to find the flow rate on the basis of the difference between those pressures.

Also, in measuring the flow rate of a fluid in a duct, there are few portions of the duct that lend themselves to optimum measurement of the flow rate, the rate of flow differing from one zone within a cross-sectional area of the fluid within the duct to another. For reducing the measurement error caused by these different flow rates across the cross-sectional area of the fluid, it is the conventional practice to divide the circular cross-sectional area of the duct into concentric circles having equal cross-sectional areas for each of which the total pressure of the fluid is measured and these measured values of the total pressure are averaged for calculating the approximate total pressure, as specified in JIS (Japanese Industrial Standards).

In a conventional apparatus for measuring the flow rate of a high-temperature dust-containing gas in accordance with the above principle, the service life of the apparatus is drastically reduced by the combination of the following factors.

(i) Pressure measuring ports and pressure conduits are repeatedly stopped up with dust and dirt solid particles introduced into the fluid pressure measurement unit with the gas.

(ii) Dust and dirt are deposited on the pressure measuring ports and the pressure conduits because the measurement unit is heated to a high temperature.

(iii) The measurement unit suffers from considerable chemical attack due to the high temperature atmosphere so that its service life is severely reduced.

(iv) The hardness of the component material of the measurement unit is reduced due to the high temperature environment so that physical erosion of the unit by the dust contained in the gas increases.

OBJECT OF THE INVENTION

It is therefore an object of the present invention to provide a measurement apparatus of the type described above, wherein the dust and dirt introduced into the measurement unit are discharged therefrom under the effect of gravity and the unit is effectively cooled by circulating cooling water in such a manner that the pressure conduits or ports are free from deposition of dust and dirt and resulting clogging, and the component materials of the measurement unit are effectively protected from chemical attack for achieving a prolonged service life of the unit.

SUMMARY OF THE INVENTION

According to one aspect of the present invention, there is provided a flow rate measuring apparatus for measuring the flow rate of a fluid containing solid particles comprising a fluid flow measurement unit disposed extending parallel to a radial cross section of a main duct, a plurality of pressure measurement ports provided on said fluid flow measurement unit to face in an upstream direction at the centers of a number of annular areas equally dividing the area of said cross section of the main duct, hydrastatic pressure ports provided to face in a downstream direction at positions for dividing the area of said cross section of the main duct into equal areas, a total pressure measurement conduit vertically disposed within the fluid flow measurement unit and having measurement ports communicated with said pressure measurement ports respectively, a hydrostatic pressure measurement conduit vertically provided within said fluid flow measurement unit and having measurement ports communicated with said hydrostatic pressure measurement ports, means isolating the interior of said measurement unit from the interior of said total pressure conduit, from the interior of said hydrostatic measurement conduit and from the exterior of said measurement unit, means for introducing and withdrawing a coolant into said isolated interior of said measurement unit for cooling said total pressure conduit and said hydrostatic measurement conduit, and means of removing solid particles from said total pressure conduit and said hydrostatic measurement conduit by gravity to the exterior of said measurement unit.

Other objects, features and advantages of the present invention will become more apparent from the following detailed description of the preferred embodiments thereof in conjunction with the accompanying drawings.

BRIEF DESCRIPTION OF THE DRAWINGS

FIG. 1 is a cross-sectional side elevation view showing the water-cooled flow rate measurement apparatus according to a preferred embodiment of the present invention, as mounted in a duct.

FIG. 2 is a front view thereof, partially cut away and partially shown in section.

FIGS. 3 and 4 are views similar to FIGS. 1 and 2, respectively, showing a modified embodiment of a measurement apparatus of the invention.

DESCRIPTION OF PREFERRED EMBODIMENTS

The flow rate measurement apparatus of the present invention is, as shown in FIGS. 1 and 2, of the type in which the total pressure and the static pressure of a flowing gas are measured for determining the gas flow rate on the basis of the pressure differential between the measured values of the total pressure and the static pressure as in the case of conventional pitot tube types. The apparatus is comprised of a generally cylindrical flow rate measurement unit or main member 10 mounted vertically and along a diameter of a main duct 1 through which flows a fluid whose flow rate is to be measured as indicated by the arrow. The unit 10 is formed with a plurality of upstream ports T for measuring the total pressure of the gas and a plurality of downstream ports S for measuring the static pressure of the gas. Inside the upstream side of the measurement unit 10, there is disposed a first conduit 12 provided with a plurality of ports t in register and communicating with the upstream side ports T of the unit 10. Inside the downstream side of the measurement unit 10, there is disposed a second conduit 14 provided with a plurality of ports s in register and communicating with the downstream side ports S of the unit 10. The interior of the measurement unit and the interior of conduits 12,14 are isolated so that water may flow therein. Inside the unit 10 intermediate the conduits 12, 14, there are also disposed side-by-side an inlet pipe 17 for introducing cooling water into the inside of the unit and an outlet pipe 18 for discharging the water from the unit after cooling. A pair of dust boxes 15, 16 are connected to the lower ends of the conduits 12, 14, respectively.

The measurement unit 10 is mounted upright and on the diameter of the main duct 1 through which flows the fluid whose flow rate is to be measured, as discussed above. The upstream side ports T are provided on the points of intersection between a plumb line passing through the center of the main duct L and for example the first, third and the fifth of the five concentric circles as counted from the duct periphery, drawn on a circular cross-sectional area of the main duct for dividing said cross-sectional area into six annular or circular zones of equal surface area. In the embodiment shown in FIG. 2, three pairs of ports T-1, T-6; T-2, T-5; and T-3, T-6 are formed in the upstream side of the duct 1 in vertical alignment with one another so that the port pairs are on the aforementioned first, third and fifth concentric circles by which the one-third area portions defined by the remaining second and fourth circles and the duct wall are divided each into smaller portions representative of one-sixth of the duct cross-section. The ports S for measuring the static pressure of the fluid are disposed on the rear or downstream side of the unit 10 in vertical alignment with each other and on a concentric circle dividing the cross-sectional area of the duct 1 into two zones of equal surface area. Thus, in the present embodiment, the downstream side ports S-1 and S-2 are provided at positions in register with the upstream side ports T-2 and T-5.

The unit 10 has its upper portion securely mounted to the duct 1 by bolts 24 through the medium of a flange 2 of the duct 1 and a flange 22 of the unit 10 in such a manner that the unit 10 vertically extends through the center of the main duct 1 and the ports T are arranged parallel to the fluid stream. Also the unit 10 has its bottom portion securely fastened to the duct 1 with a bolt 26 and a loose flange 23 provided with a seal 25 for absorbing differential thermal expansion and providing a leak-free coupling between the unit 10 and the duct L.

The first conduit 12 and the second conduit 14 are provided with the ports t and s communicating respectively with the upstream and downstream side ports T and S of the duct which extend through the inside of the measurement unit 10 and are connected at the lower ends thereof to dust boxes 15, 16 through joints 27, 28, respectively. Thus the dust and dirt contained in the gas flowing into the inside of the conduits 12, 14 through the ports T and S of the measurement unit 10 are discharged by gravity through the conduits 12, 14 and into the dust boxes 15, 16. The upper ends of the conduits 12, 14 are connected to a differential pressure measurement unit, not shown, for measuring the pressure of the fluid flowing in the duct 1.

The inlet pipe 17 and the outlet pipe 18 for the cooling water are provided for cooling the measurement unit 10 closed at the top and bottom in the manner described above. Thus the cooling water inlet pipe 17 is introduced through the upper end of the measurement unit 10 and extends downward therefrom and opens in the vicinity of the lower end of the unit 10. The cooling water discharge pipe 18 is connected to the upper end of the unit 10. Thus the cooling water conveyed through the inside of the pipe 17 is discharged in the vicinity of the lower end of the unit 10 to cool the unit 10 and be discharged via the upper discharge pipe 18.

It will be seen that, in accordance with the above described measurement apparatus of the present invention, the cooling water is supplied via the inlet pipe 17 into the inside of the measurement unit 10 to cool the unit 10 and the conduits 12, 14 and to then be discharged to the outside via the discharge pipe 18 to prevent thermal deterioration and extend the service life of the component material of the unit 10 and conduits 12, 14, while at the same time preventing the deposition of the high-temperature dust and dirt contained in the gas to be measured as it flows through the ports T and S and the conduits 12, 14 and the resulting clogging of the ports or conduits. The dust and dirt in the gas flowing into the conduits 12, 14 descends due to gravity in the conduits 12, 14 and collects in the dust boxes, 15, 16, which can then be dismounted and cleaned of the collected dust at any desired time. Thus there is no risk that the measurement cannot be performed due to dust stopping up the conduits or the measurement system, while the service life of the system in the measurement of dust-containing high-temperature gas is also prolonged.

In FIGS. 3 and 4, there is shown a modified embodiment of the flow rate measurement apparatus of the present invention that may be suitably employed in cases where the circumferential fluid flow distribution in the main duct (air pipe) is substantially uniform and the dust and dirt contained in the fluid is comparatively coarser and in lesser amounts. In this embodiment, parts or components similar to those of the preceding embodiment are indicated by the same numerals or letters affixed but with primes('). The apparatus of the second embodiment differs from the apparatus shown in FIGS. 1 and 2 in that the length of the unit 10' as well as that of the conduits may be reduced to one half that of the unit and the conduits shown in FIG. 1, the dust boxes are dispensed with, and the conduits 12', 14' are opened obliquely on the ports T', S'. Thus the measurement apparatus of the second embodiment is comprised of a generally cylindrical flow rate measurement unit 10' mounted on a plumb line diametrically of the main duct 1' through which flows the gas whose flow rate is to be measured. The unit 10' is disposed on the upper half diametral portion of the main duct and provided with upstream side pressure measurement ports T and downstream side pressure measurement ports S. In the inside of the unit 10', there is provided a first conduit 12' for measuring the total pressure of the fluid and a second conduit 14' for measuring the static pressure of the fluid, these conduits 12', 14' having inclined pressure measurement ports obliquely opening into and communicating with the upstream and downstream side ports T' and S', respectively. In the mid portion of the unit 10' and intermediate the conduits 12', 14', there are provided a cooling water inlet pipe 17' and a cooling water outlet pipe 18'. The ports T', S' are formed in the outer wall of the tubular unit 10' in the same disposition as the ports T, S of the preceding embodiment shown in FIGS. 1 and 2, except that the length of the unit 10' and the conduits 12', 14' are reduced to one half length and thus the ports T-4 through T-6 and the port S-2 are omitted.

The measurement apparatus of the second embodiment may advantageously be employed for measuring the flow rate of gas containing a relatively lesser amount of comparatively coarser dust. Since the conduits 12', 14' are opened obliquely into the associated ports T' and S', dust falls via conduits 12', 14' back into the duct 1' under the effect of gravity to be entrained in the main gas flow in the duct 1'. According to this embodiment, since the unit 10' and the conduits 12', 14' are effectively cooled by the cooling water, not only can be deposition of the dust be prevented but also physical and chemical changes of the component material of the measurement unit 10' and the conduits 12', 14' are greatly reduced extending their service life. In addition thereto, manufacturing costs are lowered by the omission of the dust boxes and the reduction in size of the measurement unit 10' and the conduits 12' 14', while heat loss is lowered and maintenance operations are facilitated by the reduction in the cooling load.

What is claimed is:

1. An apparatus for measuring fluid flow of a fluid containing solid particles, comprising:
    a fluid flow measurement unit disposed extending parallel to a radial cross sectional section of a main duct,
    a plurality of pressure measurement ports provided on said fluid flow measurement unit to face an upstream direction at the centers of a number of annular areas equally dividing the area of said radial cross section of the main duct,
    hydrostatic pressure ports provided to face in a downstream direction at positions dividing the area of said cross section of the main duct into equal areas,
    a total pressure measurement conduit vertically disposed within the fluid flow measurement unit and having measurement ports communicated with said pressure measurement ports respectively,
    a hydrostatic pressure measurement conduit vertically provided within said fluid flow measurement unit and having measurement ports communicated with said hydrostatic pressure measurement ports,
    means isolating the interior of said measurement unit from the interior of said total pressure conduit, from the interior of said hydrostatic measurement conduit and from the exterior of said measurement unit,
    means for introducing and withdrawing a coolant into said isolated interior of said measurement unit for cooling said total pressure conduit and said hydrostatic measurement conduit, and
    means for removing solid particles from said total pressure conduit and said hydrostatic measurement conduit by gravity to the exterior of said measurement unit.

2. The apparatus according to claim 1 wherein said solid particle removing means comprises dust boxes coupled to the lower ends of said total pressure conduit and said hydrostatic measurement conduit.

3. The apparatus according to claim 2 wherein said total pressure conduit and said hydrostatic measurement conduit extend from said measurement unit, and said dust boxes are coupled to said conduits exteriorly of said measurement unit.

4. The apparatus according to claim 1 wherein said solid particle removing means comprises structure coupling at least the lowermost pressure measurement port and the interior of the total pressure measurement conduit in a sloping manner so as to conduct solid particles from the interior of the total pressure measurement conduit exteriorly thereof through said lowermost pressure measurement port by gravity and structure coupling at least the lowermost hydrostatic pressure port with the interior of the hydrostatic pressure measurement conduit in a sloping fashion so as to conduct solid particles in the interior of the hydrostatic measurement conduit exteriorly thereof through said lowermost hydrostatic pressure port by gravity.

* * * * *